UNITED STATES PATENT OFFICE.

FREDERICK W. MOORE, OF PHILADELPHIA, PENNSYLVANIA, ASSIGNOR TO JOHN T. BARNES, OF SAME PLACE.

COMPOSITION FOR COATING COFFEE.

SPECIFICATION forming part of Letters Patent No. 393,917, dated December 4, 1888.

Application filed August 25, 1888. Serial No. 283,778. (No specimens.)

*To all whom it may concern:*

Be it known that I, FREDERICK W. MOORE, a citizen of the United States, residing in Philadelphia, Pennsylvania, have invented a certain Improved Compound for Coating Coffee, of which the following is a specification.

My invention relates to a preparation to size or coat the grains of roasted coffee in order to retain the strength and aroma.

In compounding the mixture I use the following ingredients: either milk or condensed milk, ground or powdered glue, liquid glycerine, and refined lard, and in some cases bicarbonate of soda, fine table-salt, and vinegar.

I will first give the proportions of my compound in making a sizing for one bag of green coffee of about one hundred and thirty pounds. To two gallons of milk add from one and a half to three and a half pounds of ground or powdered glue and from one and a half to two and a half pounds of liquid glycerine, and to this add one-sixteenth to one-half pound of bicarbonate of soda and from one-fourth to three-fourths of a pound of fine table-salt and one to three pounds of vinegar and from one to three and a half pounds of refined lard.

In place of the milk, two to four pounds of condensed milk, with or without sugar, may be used, dissolved in one to two gallons of warm water.

The milk or condensed milk is slowly heated over the fire, and when hot the glue is poured in and allowed to dissolve by slow boiling. The glycerine is then added, then the vinegar, salt, lard, and bicarbonate of soda. The mixture must be kept slowly boiling and must be stirred to prevent it from burning or scorching. After all the ingredients are added and have boiled a few moments it is removed from the fire and allowed to cool, and can be applied to the roasted coffee when medium warm. The glue is used to give the desired glaze or polish to the coffee-grains, and consequently more or less glue is added to the compound, according to the polish required, as some consumers prefer a very bright glaze or polish, while others do not like so much glaze. The liquid glycerine is used, in connection with the glue, to glaze or polish the coffee, while the bicarbonate of soda is used as a preservative of the milk, glue, and glycerine, and in order to keep them sweet. The proportion of bicarbonate of soda is regulated by the quantity of milk, glue, and glycerine. The table-salt is used to settle the coffee, so that the grounds are not in the cup when prepared for the table, and is used, also, to aid the soda in preserving the milk, glue, and glycerine. The vinegar controls the glaze and polish. The refined lard takes the place of the oil that evaporates from the coffee-bean in roasting.

It will be understood that the main ingredients are milk, glue, glycerine, and lard. The vinegar can be left out, as it affects only the glaze or polish of the roasted coffee in keeping down too high a polish. The bicarbonate of soda can also be omitted without injury, as it only acts to keep the other ingredients sweet. If the mixture should be made and used at once, the bicarbonate of soda and salt need not be used; but if the mixture is to stand any length of time it is preferable to add the above-named ingredients.

The mixture is applied to the coffee-grains in the following manner: The coffee is roasted dry—that is, without the addition of water—and the grains are then removed from the roasting-cylinder and allowed to cool enough to evaporate the compound, which is then applied gradually and evenly over the roasted coffee. The mixture consequently hermetically seals and closes the pores of the grains. The coffee is then placed on a drier, and either dried by artificial heat or by natural heat, as the case may be.

I have found in coating the grains of coffee by the above compound that I seal the grains, thus preventing the aroma from escaping and retaining the full strength of the bean, and I have found by experiments that moisture or salt or damp atmosphere cannot penetrate the bean, and consequently the coffee can be used in all climates, being always tender and fresh. I have also found that the roasted coffee, when coated, does not need the introduction of articles in the coffee-pot to settle the coffee, as the various articles used in the mixture do that work. I have also found that caffeine—a very valuable medical property of coffee—which is evaporated and lost by the old process, is retained to the fullest degree by my improved coating.

I claim as my invention—

1. A compound for coating or glazing coffee, composed of milk, glue, glycerine, and lard, in or about the proportions named.

2. A compound for coating or glazing the coffee-bean, composed of milk, glue, glycerine, bicarbonate of soda, vinegar, lard, and salt, in and about the proportions named.

In testimony whereof I have signed my name to this specification in the presence of two subscribing witnesses.

FREDERICK W. MOORE.

Witnesses:
HENRY HOWSON,
JOHN D. YARROW.